(12) United States Patent
Jenks

(10) Patent No.: US 6,610,106 B1
(45) Date of Patent: Aug. 26, 2003

(54) EXPRESSION EDITOR

(75) Inventor: Richard D. Jenks, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/384,279

(22) Filed: Aug. 27, 1999

(51) Int. Cl.[7] .......................... G06F 15/00; G06F 17/00
(52) U.S. Cl. ..................... 715/538; 715/535; 715/530; 708/142
(58) Field of Search ...................... 707/535, 538, 707/530; 708/142; 715/535, 538, 530

(56) References Cited

U.S. PATENT DOCUMENTS

| | | | | |
|---|---|---|---|---|
| 5,220,512 A | * | 6/1993 | Watkins et al. | 716/11 |
| 5,251,292 A | * | 10/1993 | Martel et al. | 707/527 |
| 5,544,262 A | * | 8/1996 | Pagallo | 382/189 |
| 5,680,638 A | * | 10/1997 | Satoh | 707/538 |

OTHER PUBLICATIONS

Mathematics, Third Edition, Stephen Wolfram, Cambridge University Press, ISBN0–521–58889–8, 1996, p. 175–180.
Using Adobe FrameMaker 5, Windows 95/Windows 97/Macintosh, Adobe Systems Incorporated, Chapter 28, written by Ron Aritzur. (Author, Milo, 1988–1995) and NuCale, pp. 28-8 through 28–13.

Math Type: Mathematical Equation Editor, User manual, Design Sciences, Inc., Sixth Printing, Jan. 22, 1996, pp. 3–1 through 3–11.

Knuth, Fundamental Algorithms: The Art of Computer Programming, vol. 1, 1968, Addison Wesley, p. 305.

* cited by examiner

*Primary Examiner*—Joseph H. Feild
*Assistant Examiner*—Rachna Singh
(74) *Attorney, Agent, or Firm*—Whitham, Curtis & Christofferson, P.C.; Stephen C. Kaufman

(57) ABSTRACT

An expression editor for creating and editing mathematical formulas is implemented as a computer software program. Using the editor, a keyboard and mouse are used to perform actions that build and traverse mathematical structures with a single visual cue, either for the purpose of displaying mathematics in a document, performing a scientific computation, or any combination of the two.

6 Claims, 13 Drawing Sheets

$$\left. \frac{x - y^{2+n}}{u + v} \right| \neq w \qquad \overline{\left| \frac{x - y^{2+n}}{u + v} \right|} \neq w$$

| Step | User types | Display | Comments |
|---|---|---|---|
| (a) | | ▨ | Begin with a highlighted empty box. |
| (b) | $x$ | $x$ | The operand fills the box and becomes current expression. |
| (c) | ^ | $x^▨$ | Another highlighted empty box is presented for the exponent. |
| (d) | 2 | $x^2$ | Again the operand replaces the box. |
| (e) | + | $x^2$ | Move up to highlight scripted variable. |
| (f) | + | $x^2 + ▨$ | In general, an infix operator will produce an highlighted empty box... |
| (g) | 1 | $x^2 + 1$ | ... that is filled by the operand. |

FIG.6A

| Step | User types | Display | Comments |
|---|---|---|---|
| (a) | $\frac{nx}{2}$ | $sin \frac{nx}{2}$ | Convert highlighted argument to $x_n$ |
| (b) | DELETE | $sin$ | Deletion moves highlight to the left. |
| (c) | $x$ | $sin\ x$ | Highlight moves to newly inserted character. |
| (d) | $n$ | $sinx\ n$ | Make a mistake. |
| (e) | DELETE_n | $sinx\ n$ | Replace argument by $x_n$ |

FIG.6B

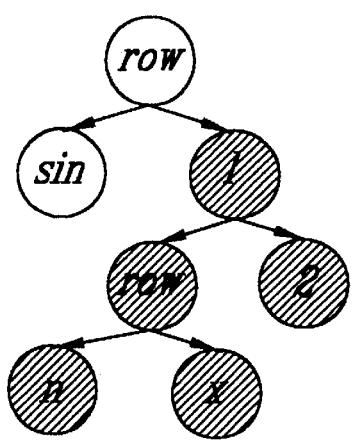
FIG.7A
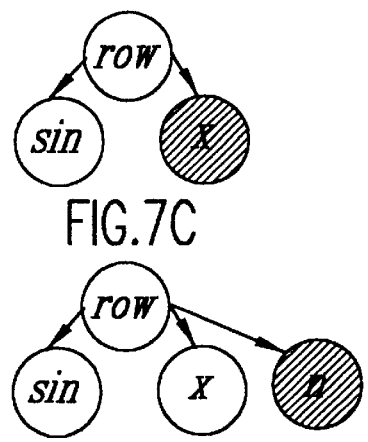
FIG.7C
FIG.7D
FIG.7B
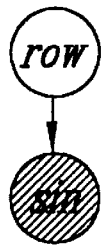
FIG.7E
| Step | User types | Display | Comments |
|---|---|---|---|
| (a) | | $\frac{12xy}{1+\cos(\text{▨})}$ | Let's add the fraction $\frac{nx}{2}$ to argument t. |
| (b) | + n x | $\frac{12xy}{1+\cos(1+n\text{▨})}$ | Insert numerator of the fraction. |
| (c) | CTRL&- | $\frac{12xy}{1+\cos(1+\text{▨})}$ | Extend highlight left to include the n. |
| (d) | / 2 | $\frac{12xy}{1+\cos(1+\frac{nx}{\text{▨}})}$ | Create fraction and denominator. |
FIG.8

EXPRESSION EDITOR

BACKGROUND OF THE INVENTION

1. Field of the Invention

The present invention generally relates to an expression editor for mathematics and, more particularly, to a computer software program used to create and edit mathematical formulas. Using the editor, the keyboard and mouse can be used to perform actions that build and traverse mathematical structures that have been built either for the purpose of displaying mathematics in a document or performing a scientific computation.

2. Background Description

Many existing expression editors assume that the main intent of using the editor is to create mathematical formulas for presentation, achieving an optimum layout, positioning and relative sizing of the constituent elements so as to assure a display of the finest quality on the printed page. Such presentation-based editors typically allow the construction of mathematically meaningless expressions and represent mathematics in a form unsuitable for direct interpretation by a computational mathematics program.

Other expression editors create mathematical formulas for content; that is, the editors are designed to create only expressions that are mathematically meaningful for computation using a computational mathematics program associated with the editor.

SUMMARY OF THE INVENTION

It is an object of the present invention to provide an expression editor with a simple and intuitive interface that can be used to edit mathematical expressions created either for presentation or content. The present invention is distinguished by three interrelated sub-components:

1. a hierarchy of mathematical objects that relate to either or both the graphical rendering of the mathematics on the printed page, and the interpretation of formulas by a computational system;
2. WYSIWYG ("what-you-see-is-what-you-get") editing of mathematics by use of a single visual cue: a highlighted sub-expression; and
3. correlating these mathematical objects and single visual cue with keyboard actions for purposes of insertion, deletion, and navigation.

BRIEF DESCRIPTION OF THE DRAWINGS

The foregoing and other objects, aspects and advantages will be better understood from the following detailed description of a preferred embodiment of the invention with reference to the drawings, in which:

FIGS. 6A and 6B are tables showing, respectively, an insertion example and a deletion example;

FIG. 7 is a diagram of an example of a succession of trees for the examples of FIGS. 6A and 6B;

FIG. 8 is a table showing a "sticky left" feature implemented using the single visual cue of the present invention.

DETAILED DESCRIPTION OF A PREFERRED EMBODIMENT OF THE INVENTION

The features of the invention as set forth above are described below so that one skilled in the art can replicate, reproduce, or use the invention. For the purpose of this discussion, the terms "mathematical expression" and "formula" will be used interchangeably. In comparing mathematical expression editors to ordinary text editors, the term "text" will be used to refer to the fragments of ordinary text or formula fragments produced by the user typing keyboard characters.

Mathematical Objects

The first sub-component of the invention concerns a hierarchy of mathematical "objects". As mentioned above, existing expression editors such as MathType™ assume that the main intent of using the editor is to create mathematical formulas for presentation, achieving an optimum layout, positioning and relative sizing of the constituent elements to assure a display of the finest quality on the printed page. Such presentation-based editors typically allow the construction of mathematically meaningless expressions and represent mathematics in a form unsuitable for direct interpretation by a computer algebra system.

Other expression editors such as those for Mathematica™ and Nucalc™ create mathematical formulas for content. Such editors are designed so as to create only expressions that are mathematically meaningful for computation using a computational program (Mathematica™ and Nucalc™) associated with the editor.

The approach of the present invention is based on a hierarchy of mathematical objects that include two-dimensional structures common in mathematics:

$$2x + \cos\frac{x}{y} x^n \sqrt{x} \begin{bmatrix} a & b \\ c & d \end{bmatrix}$$

primitive objects such as numbers, symbols, operators and known operation "words" such as "cos" that denote a mathematical functions.

fractions "x over y" with a numerator object x vertically positioned above a denominator object y;

script objects such as "x superscript n" consisting of a base object x and a superscript object n;

radical objects such as "square root of x"; and matrix objects, i.e., rectangular arrays of rows and columns of other objects.

Other useful objects to include are:

horizontal "rows" of juxtaposed mathematical objects;

enclosures, objects enclosed in some combination of parentheses, brackets, or braces;

apply-objects, i.e., those that apply a function to a set of zero or more argument objects; and space-objects, i.e., those that are used to affect the spacing or positioning of constituent objects.

Figure 1:
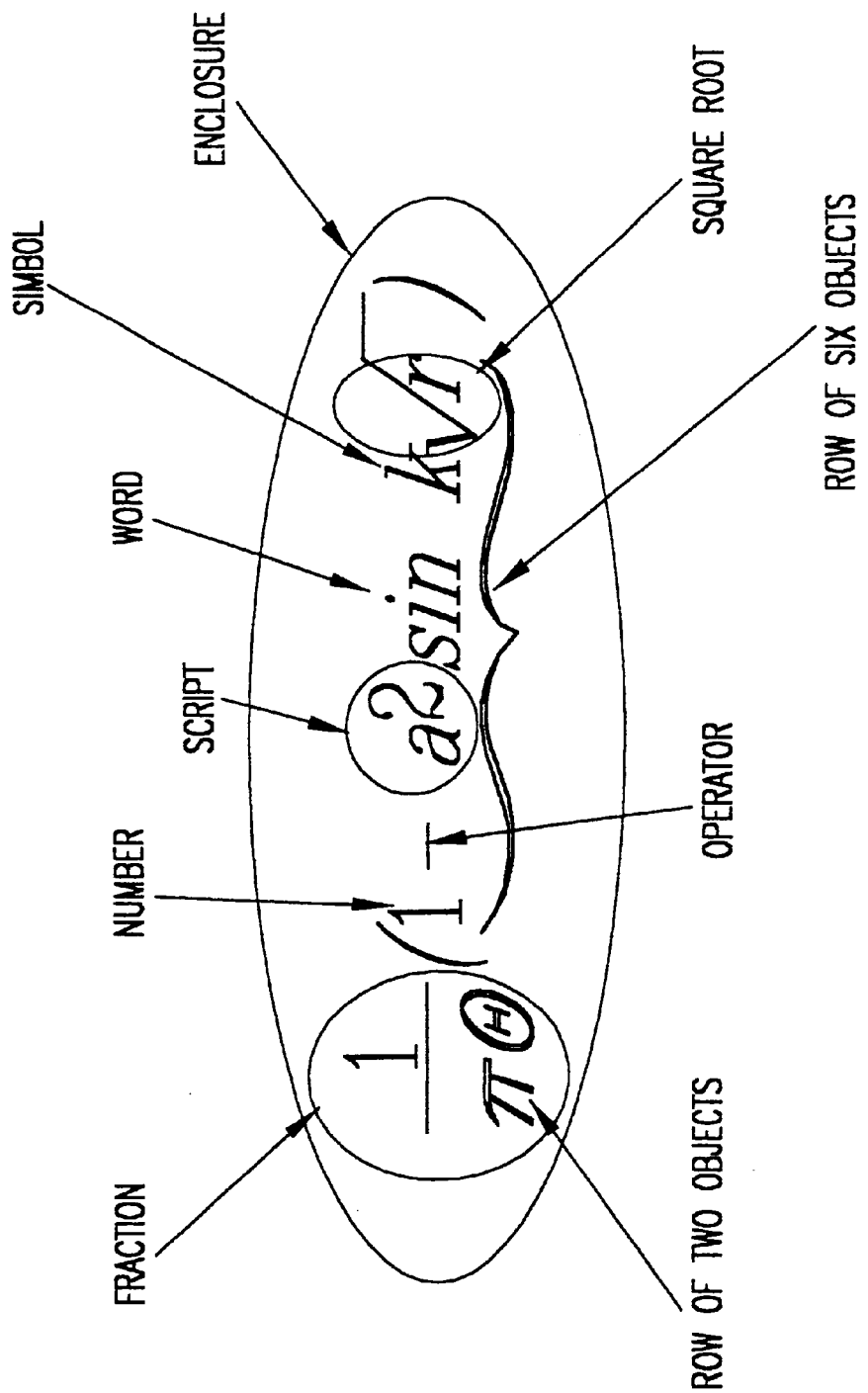
FIG. 1 is an illustration showing the anatomy of a mathematical expression.

FIG. 1 shows how a typical mathematical expression can be described as a composite of objects of these kinds.

In this invention, each different kind of mathematical expression corresponds to a distinct kind of mathematical object. The mathematical expressions and corresponding mathematical objects that this invention allows can always be represented by expression trees, that is, "trees" that represent expressions. For a formal definition of tree, see *The Art of Computer Programming*, Volume 1, *Fundamental Algorithms*, Donald E. Knuth, Second Edition, Addison-Wesley Publishing Company (1973), page 305. Intuitively, trees are structures with nodes and branches visually resembling trees in nature (but inverted), that have a distinguished "root" node of which every other node is a descendant. Each node of a tree has zero or more children that are also trees. Trees have no cycles, that is, no node can be an ancestor of itself.

Trees provide both a convenient user model for conceptualizing mathematical expressions and corresponding mathematical objects, as well as providing a useful and natural data structure for representing mathematical expressions. Indeed, expression trees are common data structures that have been used to represent mathematical expressions in computer algebra systems since their inception.

Expression editors allow users to modify an expression by either adding new components via insertion or to remove existing components using deletion. By beginning with an empty expression, new expressions can be built from scratch using insertion. A user thus builds mathematical expressions from other expressions, with some mathematical expressions containing others as sub-components. Since mathematical expressions, mathematical objects, and expression trees are all in correspondence, mathematical objects, respectively expression trees, generally contain other mathematical objects, respectively expression trees, as sub-components.

As every mathematical object can be represented by an expression tree and vice-versa, we will use the terms mathematical objects and expression trees interchangeably.

The mathematical objects and expression trees correspond to mathematical expressions that can be created using the editor of the present invention. A given implementation of the present editor is assumed to offer a user interface environment for creating expressions that allows options to users, options that may determine what actual objects and expression trees are built for a given formula. Thus, it is possible for a given editor to be able to produce different objects and expression trees even for the identical expression.

Figure 2:
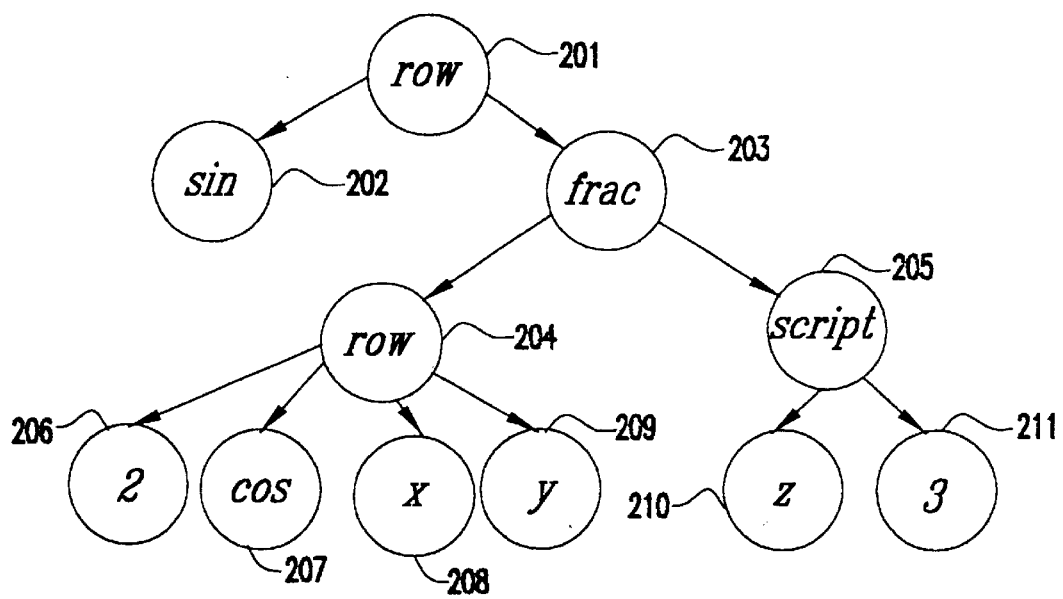
FIG. 2 is a diagram of a presentation tree for $$\sin\frac{2\cos xy}{z^3};$$
Figure 3:
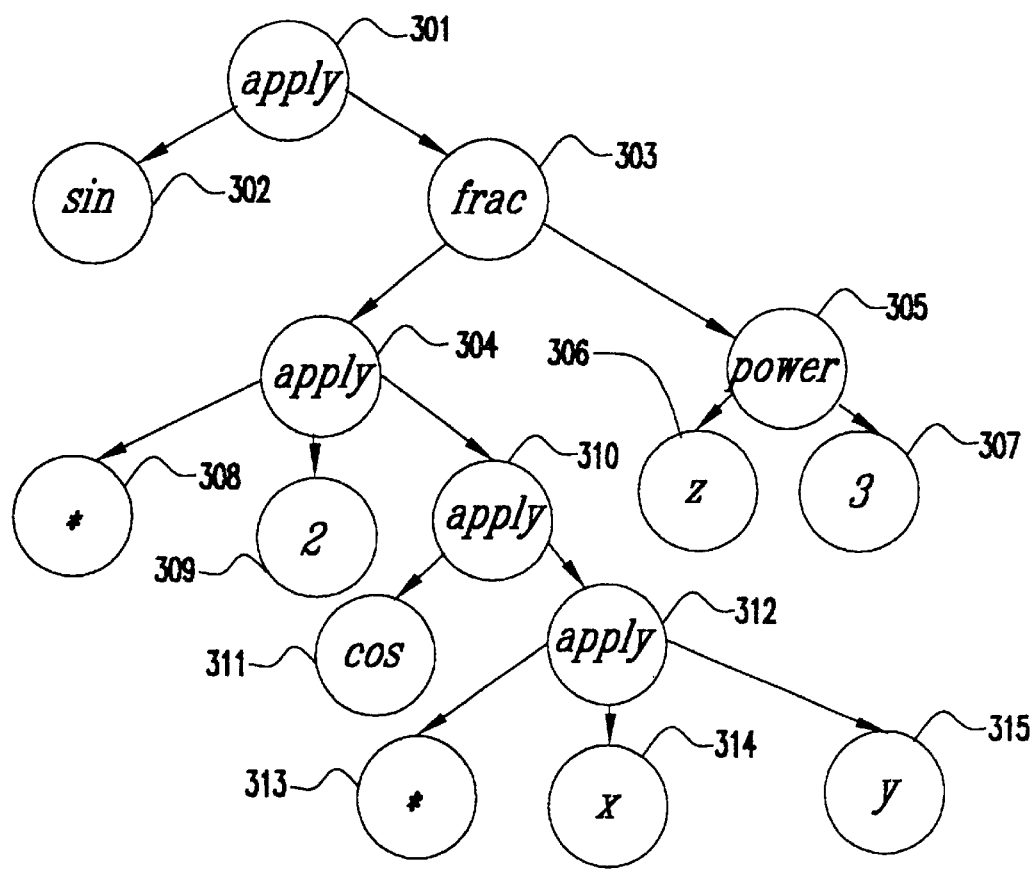
FIG. 3 is a diagram of the content tree for $$\sin\frac{2\cos xy}{z^3};$$

FIGS. 2 and 3 illustrate how expression tree representations can differ for the same expression, one constructed for presentation, the other for content.

In FIG. 2, the presentation tree for the expression $$\sin\frac{2\cos xy}{z^3},$$

the root object 201 is "row" from which branch the nodes 202 "sin" and 203 "frac". The branches from the node 203 "frac" designate, respectively, the numerator and the denominator of the fraction. The first node in the construction of the numerator is the node 204 "row" from which there are branches to the nodes 205 "2", 206 "cos", 207 "x" and 208 "y". The first node in the construction of the denominator is the node 209 "script" from which there are branches to the nodes 210 "z" and 211 "3". In this way, the function $$\sin\frac{2\cos xy}{z^3}$$

is visually constructed for presentation to a viewer.

In FIG. 3, on the other hand, the same function is built using a content tree. The root node 301 of this tree is "apply" with branches to the nodes 302 "sin" and 303 "frac". The branches from the node 303 "frac" are to the nodes 304 "apply" and 305 "power". The branches from the node 305 "power" are to the nodes 306 "z" and 307 "3". The branches from the node 304 "apply" are to the nodes 308 "*" (the multiply operator), 309 "2" and 310 "apply". The branches from the node 310 "apply" are to the nodes 311 "cos" and 312 "apply". Finally, the branches from the node 312 "apply" are to the nodes 313 "*", 314 "x" and 315 "y". Thus, unlike the presentation tree of FIG. 2, the content tree of FIG. 3 provides the mathematical operators to perform the computation represented by the function $$\sin\frac{2\cos xy}{z^3}.$$

Visual Cue

Turning now to the second sub-component of the invention, that of providing a single visual cue, in the form of a highlighted enclosing a sub-expression, is used with the WYSIWYG expression editor for mathematics. Similar to editors designed for editing ordinary text, those that edit mathematical expressions must provide both for insertion and deletion.

Known expression editors provide at least two separate visual cues for editing, one for insertion and another for deletion. The visual cue for insertion in mathematical expressions is a cursor which, similar to those for ordinary text editors, is a marking designed to visually identify where newly inserted formula fragments will be inserted in an expression.

Figures 4A, 4B, 5:
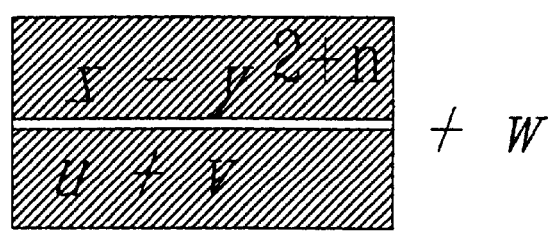
FIGS. 4A and 4B show two examples of cursors used in known expression editors.
FIG. 5 is an example of highlighting performed in known editors.

FIGS. 4A and 4B show the design of cursors for two expression editors, one (FIG. 4A) for the Nucalc™ graphic calculator, the other (FIG. 4B) for MathType™ expression editor, each displaying the same formula. The cursor in the Nucalc™ graphic calculator is a blinking vertical line that appears either to the right or left of a subexpression. New formula fragments typed at the keyboard are inserted to the right of the cursor. The MathType™ expression editor's cursor is a blinking "inverted-T" that has a vertical segment with a similar look and meaning as that of the Nucalc graphic calculator. The vertical segment also appears to the right or left of a sub-expression and is attached to a horizontal segment underlining a larger sub-expression.

Customary text editors allow the user to "select" a portion of text using the mouse. The selected text is then typically displayed in reverse video to make it stand out from unselected text. Similarly, known expression editors provide a second visual cue for deleting a selected sub-expression. The user selects a mathematical sub-expression, say, by clicking with the mouse then dragging out an outlining rectangle that encloses the sub-expression. The selected sub-expression is highlighted, again displayed in reverse video or else enclosed in a specially colored or shaded box to make it stand out from the unselected remainder of the formula. Once a sub-expression is highlighted, the user can, say, type the Delete key to remove the sub-expression from the entire expression. FIG. 5 illustrates a highlighted term of a sum in the MathType™ expression editor.

Recall that as a second sub-component of this invention, the mathematical expression editor uses a single visual cue. By the single visual cue, what is meant is that as a user is editing the whole or part of a mathematical expression, exactly one sub-expression wholly contained within the mathematical expression is highlighted at all times. This highlighted sub-expression is called the current expression. The highlighted current expression both identifies expressions to be deleted and serves as a cursor to identify the insertion point for new formula fragments.

The user interface for the expression editor is designed using a single visual cue. Assume that a user wishes to create a formula from scratch. To do this, the initial current expression presented to the user is a highlighted empty box (technically speaking, the current expression is the empty object). A highlighted empty box means that a newly inserted formula fragment typed by the user will replace the box and become the next current expression.

In general, keyboard keys and mouse clicks can initiate actions that build an expression from the initial highlighted empty box and move the highlight from left-to-right. When the character denoting an infix operator such as +, −, * or /is typed, a new highlighted empty box can be presented as the second operand. FIG. 6A shows a user interface design based on this paradigm for the step-by-step creation of the expression "x-squared plus 1". FIG. 6A shows the insertion example which begins in step (a) with a highlighted empty box. In step (b), the operand x fills the box and becomes the current express. In response to the typed operator "^" in step (c), another highlighted empty box is presented for the exponent. Then, in step (d), the operand "2" replaces the box. In step (e), the up arrow is entered to highlight both x and the exponent 2. The infix operator "+" produces another highlighted empty box in step (f). Finally, in step (g), the operand "1" fills the empty box.

According to the above design, all characters are inserted to the right of the current expression with newly inserted formula fragments becoming new current expressions. This user interface design is based on the observation that almost all insertions in practice will be to the right of editing text or an empty box. Even if a formula fragment needs to be inserted at the extreme left of the current expression, once the left-most character of that formula fragment is entered, any remaining characters of the fragment can then be inserted to the right.

There are many ways an user interface can provide for a rarely needed insertion to the left. For example, either a special highlighted symbol can be provided to the extreme left of an expression or else a modifier key can be struck prior to initiating the insertion action.

Turning now to deletion, as mentioned above, a delete action customarily causes the current expression to be removed from the entire expression. FIG. 6B shows an example design of a user interface for an expression editor based on this single visual cue concept for deletion. As in the Nucalc™ graphic calculator, this interface design assumes that different single alphabetic characters denote distinct symbol names. In this example, the function $$\sin \frac{nx}{2}$$

is converted to sin $x_n$. The process begins with the fraction $$\frac{nx}{2}$$

highlighted in step (a). In response to pressing the Delete key in step (b), the fraction is deleted and the highlighted box moves to the left. In step (c), typing the operator x causes the highlight to move to the newly inserted character. In step (d), the user makes a mistake and types simply the operator n resulting in the expression sinxn. Since the highlight has moved to the newly entered character, the user simply presses the Delete key followed by typing the underscore operator followed by the character n, i.e., "_n", in step (e) which results in the character n being entered as a subscript.

Sub-component 2 of this invention follows from sub-component 1 in a conceptual and intuitive manner. A visually highlighted current expression corresponds naturally to that of a subtree of the whole expression tree that represents the entire expression.

FIGS. 7A–7E show a possible succession of expression trees produced as a result of the interactions in FIG. 6B. Here we shade the subtree associated with the various highlighted current expression, a subtree of the expression tree representing the entire expression. The original expression is represented as a row object of two children. The second child represents the current expression and thus is shaded. Step (b) is obtained from step (a) by deleting the shaded subtree from the current expression, leaving "sin" as the current expression. The insertion of x causes a child node to be added to the row, with the new child node representing the new current expression. Similarly a child node for n is added and represents the next current expression. Next, the n is deleted shifting the highlight back to the x node. The x node is then replaced by an expression tree with root marked "sub" here denoting a script object.

Keyboard Actions

Again recall the third sub-component of the invention; i.e., the correlation of the mathematical objects and a highlighted expression with keyboard actions for purposes of insertion, deletion, and navigation. By correlation, what is meant is that each kind of object can define logical, intuitive, and useful actions for moving the highlight around its various constituent parts. Since all objects have corresponding expression trees, these actions can be designed to give a common look and feel and to facilitate navigation around expressions composed of many diverse objects.

Here is an example of how such a correlation can be achieved. First, an ordered list of parts of each kind of object can be defined. For those mathematical objects listed above as common in mathematics, for example, the parts most often directly correspond to the immediate children of their corresponding expression tree:

numbers, symbols, operators, and words have no parts;

a fraction has a numerator and denominator as parts;

a scripted object has a base and a number of scripts, one of which is non-empty;

a radical object has a base and a visible or invisible index (the degree of the root); and a matrix has its components as parts.

Second, actions can be associated with each of the four arrow keys for each object with respect to its ordered list of parts. One example action association that is possible is the following. When one of the parts of an object is the current expression, the right-arrow key moves the highlight from the current expression to the next sibling part. The left-arrow key moves the highlight to the previous sibling part. The up-arrow key moves the highlight to the entire object itself. The down-arrow moves the highlight to some designated part of the current expression, again dependent on the kind of the current expression.

The above action association is sufficient to move the highlight from any object to any of its parts, or vice-versa. A practical expression editor might allow more, such as providing a capability of creating new objects by combining parts in new ways to form new expression trees.

One example design to make this happen is the following. Allow a modifier key, say the Ctrl key, such that when that modifier key is held down when the left- or right-arrow key is typed, the highlight, rather than shifting left or right, instead extends left or right to form a new object containing both the current object and its adjacent sibling. Since the old highlighted object is effectively "held onto", this user-interface feature might be termed a "sticky left" or "sticky right" action.

FIG. 8 shows a user-interface design that permits the "sticky left" feature for combining adjacent siblings. In step (a), a mathematical formula is displayed in which it is desirable to add the fraction (nx/2) to the argument t. To do this, the argument t is highlighted using the single visual cue of the present invention. In step (b), "+n x" is typed so that the argument how read "t+n x" with variable "x" highlighted. In step (c), the Ctrl key is depressed and the left arrow key is then depressed, the effect of which is to "drag" the highlight so that it encompasses the "n x" portion of the argument. Finally, in step (d), the "n x" argument is formed into a fraction with "2" as the denominator.

Figure 9:
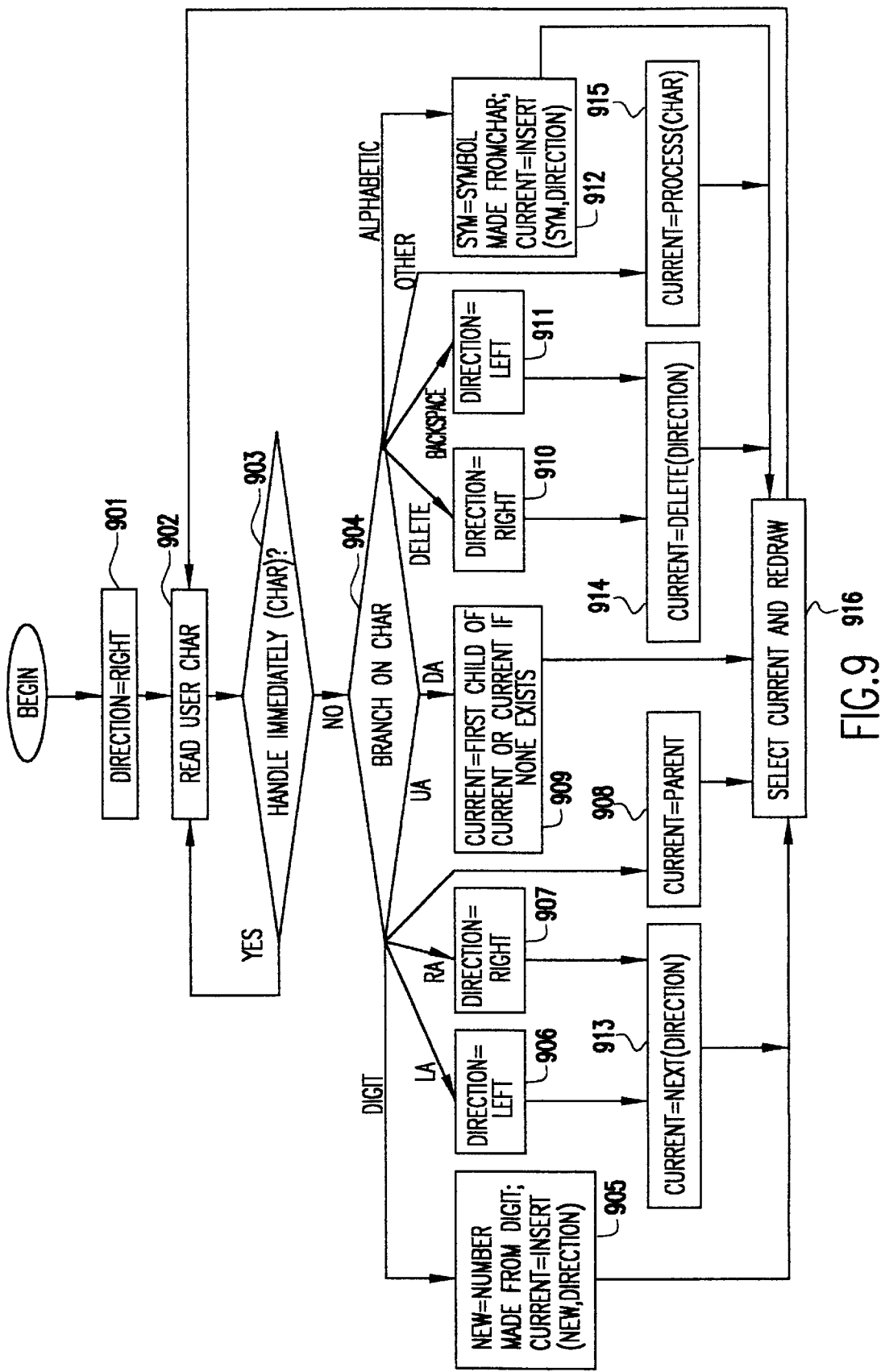
FIGS. 9–16 are flow diagrams showing one illustrative way in which the logic of software of the expression editor of the invention may be implemented.

FIG. 9 shows a flow diagram of a main control loop corresponding to a software algorithm illustrative of how the present invention may be implemented. In accordance with this algorithm, actions for inserting, deleting, and navigating through parts of a mathematical expression are performed using the four arrow keys on a standard computer keyboard. However, those skilled in the art can appreciate that other keyboard keys may just as easily be used. The parts, or mathematical objects, of this expression include numbers (strings of consecutive digits), symbols denoted by single alphabetic characters, fractions, scripted objects, square roots, and parenthesized expressions. Fractions, square roots, and parenthesized expressions are built by the user by, for example, typing special keys. Scripted objects are subscripts and superscripts. The algorithm adds a subscript to an existing superscripted variable or a superscript to an existing subscripted variable. While this algorithm does not specifically allow for function names such as "sin" directly, it could be modified to do so, for example, by translating mouse clicks on a "function palette" into special alphabetic characters.

In FIG. 9, creation of a mathematical expression begins, at block 901, with a user entering a keyboard character representing an initial mathematical object of the expression. This is shown, for example, in step (b) of FIG. 6A, where the character "x" is inserted into the highlighted empty box. In FIG. 9, the creation of a mathematical expression begins, at block 901 ("direction=right" is shorthand for indicating that the (initial) value of the program variable "direction" is set to "right", so that initially any insertion of characters will always be made to the right of the currently highlighted box). At this time, the user is presented with an empty highlighted box as shown in FIG. 6A.

The initial character is then read at block 902. In block 903, a decision is made as to whether or not the current highlighted expression will immediately handle the character. If, for a first example, the currently highlighted box is empty and the character is an alphabetic character such as "x", the "x" is handled immediately as shown in FIG. 6A: it is inserted in the empty box. As a second example, if the currently highlighted box contains a number, say "2", and the character read from the user is "3", the character is immediately handled so as to append the "3" to the number to form "23". In both of these cases, block 903 produces a "yes" answer and control returns to block 902 so that an another character can be read. If block 903 produces a "no", the expression is modified by an action branch of block 904.

From block 904, one of nine actions are taken depending upon the character read at block 902. In the blocks corresponding to each of these actions, the word "current" represents the portion of the mathematical expression that is currently enclosed within a highlighted box.

The first action, in block 905, involves entry, through the keyboard, of an initial digit of a number. (In this block, "new=number made from digit" is shorthand for indicating that the program variable "new" denotes a number created from that digit, and "current=insert(new,direction)" is shorthand for indicating that the variable "current" denotes the result of applying the function "insert" to two parameters: "new", the value of which is the expression to be inserted, and "direction", right or left, which tells whether the insertion is be respectively after or before the currently highlighted box. After the new number has been inserted, control flows to block 916.

The second action, in block 906, corresponds to the left arrow key being depressed, which sets the direction to be "left". The third action, in block 907, correspondingly sets the direction to be "right". In both of these cases, control passes to block 913 which sets the variable "current" to the value of the function "next" applied to the direction, either "left" or "right" as described in FIG. 12 and below.

The fourth action, in block 908, corresponds to the up arrow being depressed, which causes the parent mathematical object to be highlighted.

The fifth action, in block 909, corresponds to the down arrow key being depressed, which causes the first child object of the currently highlighted parent expression to be highlighted; however, if none exists, the current expression remains highlighted.

The sixth action, in block 910, corresponds to the delete key being depressed, and sets the direction to be "right". The seventh action, in block 911, correspondingly sets the direction to be "left". In both of these cases, control passes to block 914 which sets the variable "current" to the value of the function "delete" applied to the direction, either "left" or "right" as described in FIG. 14 and below.

The eighth action, in block 912, involves the entry by the user of an alphabet character representing a symbol in the mathematical expression.

The ninth action, in block 915, involves the entry by the user of a character other than those discussed above. For example, the character may be a mathematical operator such as a divide symbol or square root. The value "current" is set to the result of applying the function "insert" to the symbol and the direction as described in FIG. 13 and below.

After the actions of blocks 905, 908, 909, 913, 914, and 915 are performed, process control flows to block 916, wherein the highlighted box is moved from its present position to that expression that is denoted by the variable "current" and the entire user expression is then redrawn. Control then returns to block 902 to read any further characters entered from the keyboard by the user. The individual steps of the algorithm will now be discussed in detail below.

Figure 10:
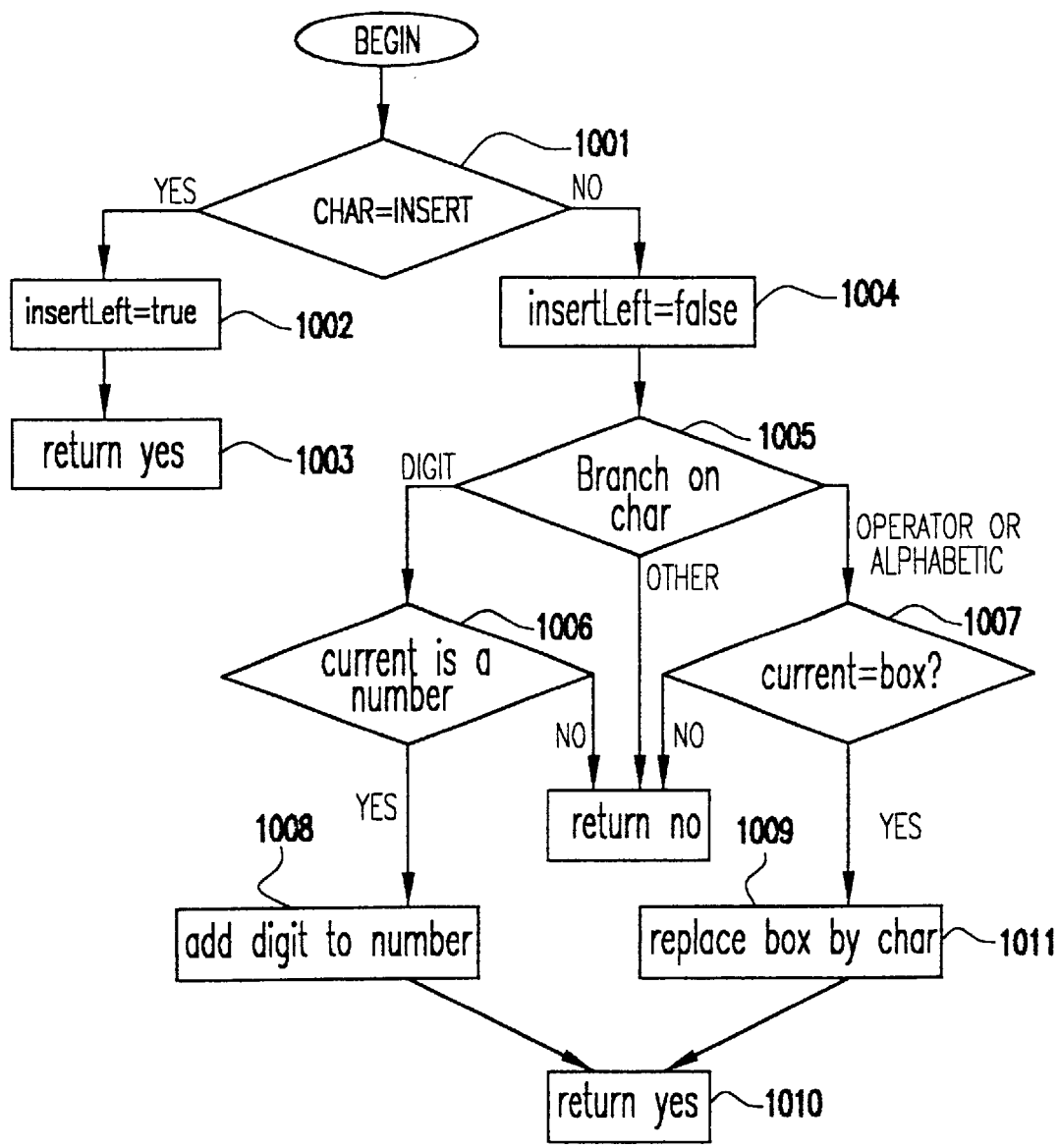

FIG. 10 shows a flow diagram of steps included in block 903 of FIG. 9. In block 1001, a decision is made as to whether the character entered by the user is the Insert key. If yes, the variable "insertLeft" is set to true in block 1002 and control is returned to block 902 of FIG. 9, via block 1003. If no, the variable "insertLeft" is set to false in block 1004 and control passes to block 1005 where a branch is made on the character entered by the user. If the character is a digit, a decision is made in block 1006 as to whether the current expression is a number. If yes, the digit character is appended to the end of the number, block 1008, with control passing back to block 902 of FIG. 9, via block 1010. If the character is either an alphabetic character or an operator such as +, -, or =, a decision is made in block 1007 as to whether the current expression is an empty box. If yes, the character is inserted into the empty box in block 1011 and control is passed to block 902 of FIG. 9. In all other circumstances, control is passed to block 1009 and subsequently to block 904 of FIG. 9.

Figure 11:
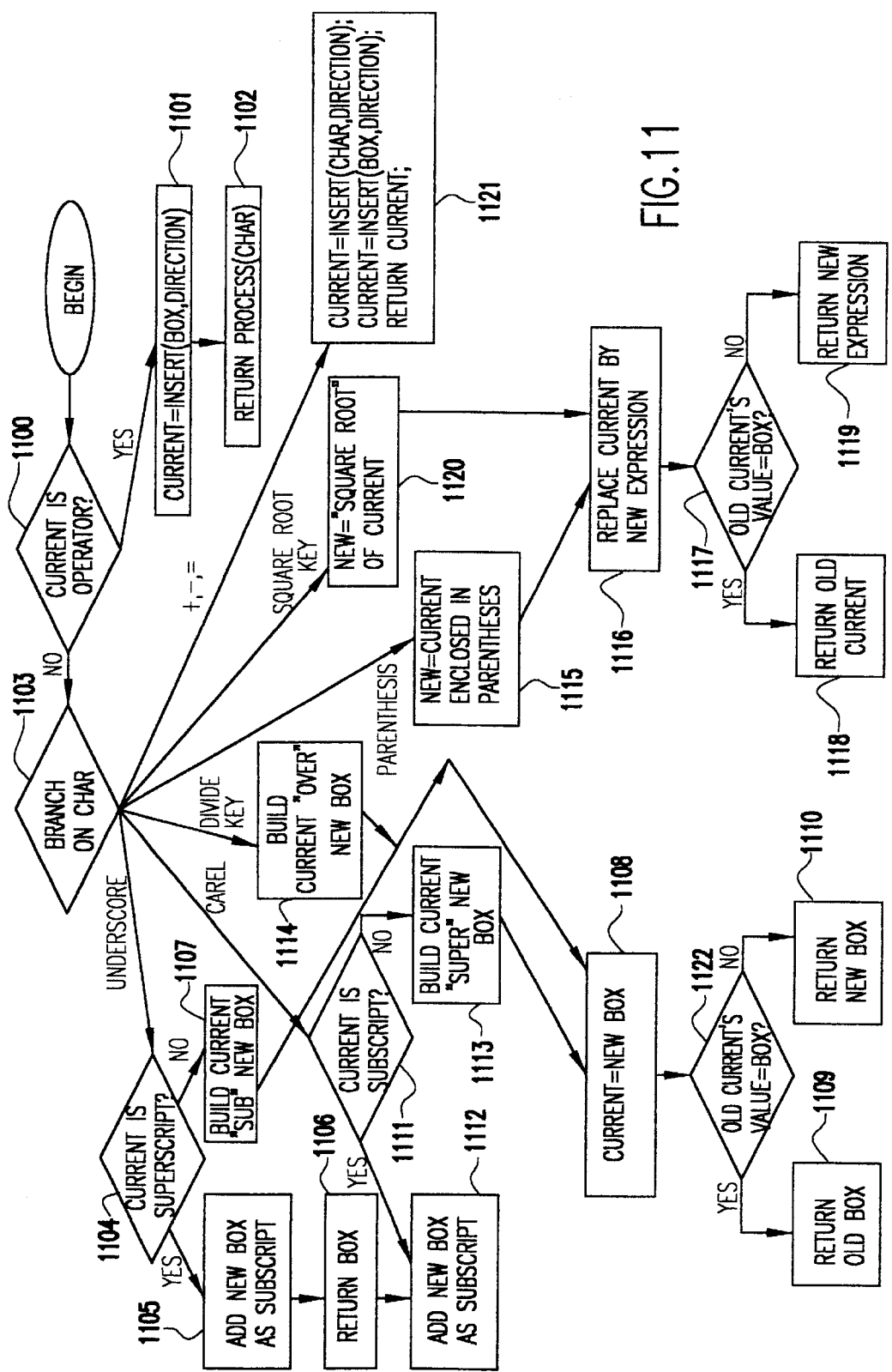

FIG. 11 shows a flow diagram of steps taken in block 915 of FIG. 9. In FIG. 11, a decision is first made in block 1100 as to whether the current character is an operator symbol such as +, -, or =. This occurs, for example, as the result of a user entering the symbol "-" into an empty box which according to FIG. 10 causes that symbol to be inserted into the empty box. If yes, a new empty box is inserted into the expression in block 1101 and control passes recursively to block 1100 with the current expression replaced by the inserted empty box, see block 1102.

If the current character is not an operator symbol, control passes to block 1103 where one of 6 actions are initiated depending on which of several characters was entered by the user.

If the current character is an underscore, the editor prepares to create a subscript in block 1104. First, a decision is made as to where the current expression has no existing subscript but has a superscript. If yes, the subscript will be added as a second script; in this case, in block 1105, a new empty box is inserted as the subscript. Control then returns to block 916 of FIG. 9 with this second script designated as the new current expression, via block 1106. If no, a new scripted variable is created in block 1107 having the current expression as its base and an empty box as its subscript. Control passes to block 1108 where a decision is made as to whether the currently highlighted expression is an empty box. If yes, in block 1109, this empty box is designated as the new current expression so that this highlighted empty box remains highlighted. If no, the new empty box is designated in block 1110 as the new current expression. In either case, control passes to block 916 of FIG. 9.

If the current character is a caret, the editor similarly prepares to create a superscript in block 1111.

If the current character is the divide key (/), the editor similarly prepares to create a fraction in block 1114 whose numerator is the current expression and whose denominator is a new empty box.

If the current character is a parenthesis, the editor prepares to create a parenthesized expression in block 1115. First, the current expression is enclosed in parentheses, that is, a left parenthesis is inserted before the current expression and a right parenthesis is inserted after the current expression. Control then passes to block 1116 where the currently highlighted expression is replaced by the parenthesized expression. In block 1117, a decision is made as to whether the expression enclosed in parentheses is an empty box. If yes, the old current expression is returned to be the new highlighted expression in block 1118. If no, the parenthesized expression is returned to be the new highlighted expression in block 1119.

If the current character is a special key designated for creating a square root, the editor similarly prepares, in block 1120 to create the square root of the current expression.

If the current character is one of the operators +, -, or =, control passes to block 1121 where the operator is inserted together with a subsequent empty box which is returned to be the next highlighted expression. In this and all preceding cases of FIG. 11, control passes to block 916 of FIG. 9.

Figure 12:
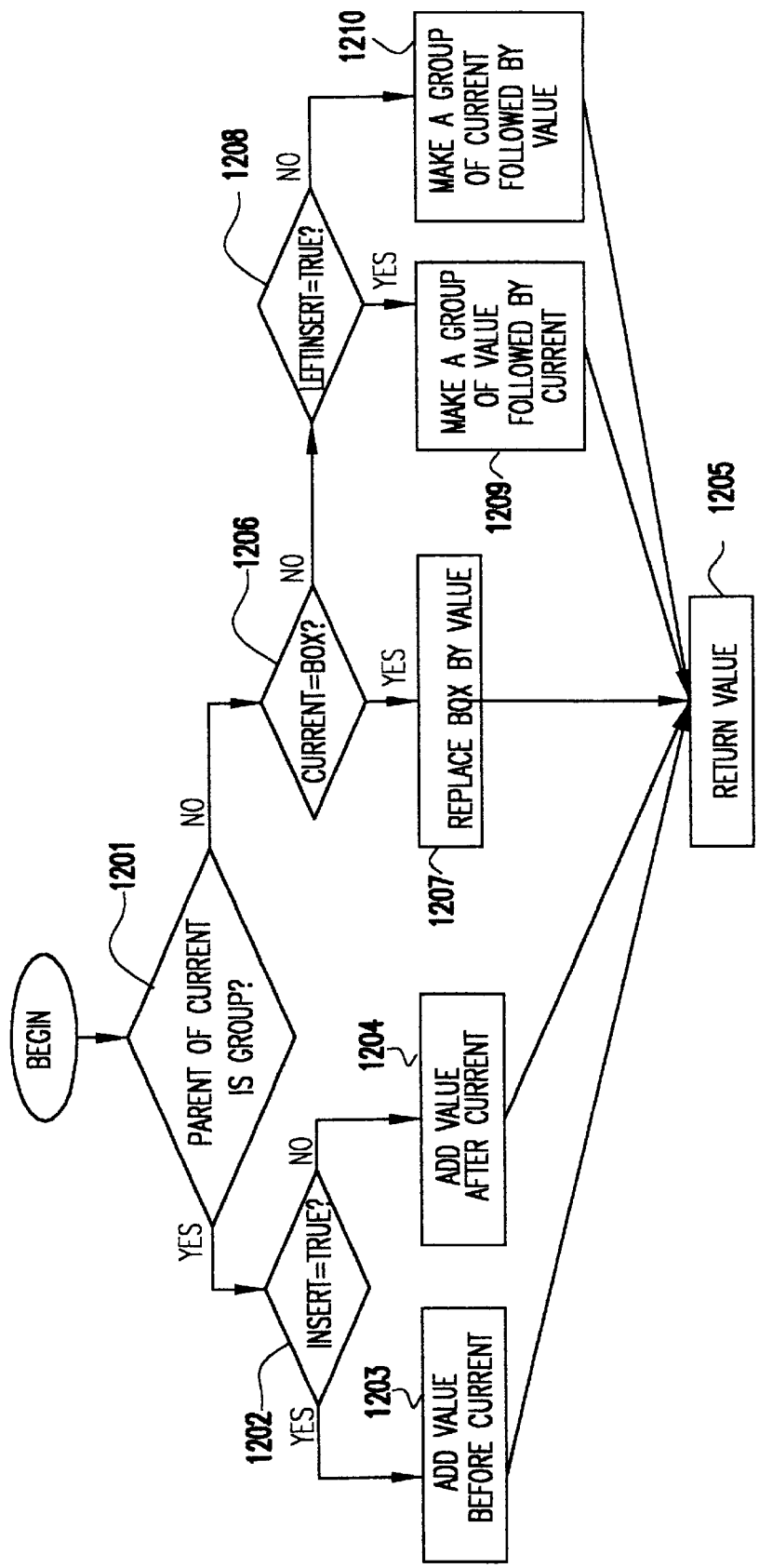

FIG. 12 shows a flow diagram of steps taken in blocks 905 and 912 of FIG. 9 that implement the function insert applied to two arguments: value, an expression to be inserted, and direction, left or right, that determines whether the insertion will be made respectively before or after the currently highlighted expression. In FIG. 12, it is first determined, in block 1201, whether a parent of the expression currently highlighted is a group. (The term "group" is analogous to "row" in FIGS. 2 and 7). If yes, it is then determined in block 1202 if leftInsert=true, and if so the value is inserted by block 1203 before the current expression. If no, the value is inserted by block 1204 after the current expression.

If the parent is not a group, a decision is made at 1206 if the current expression is an empty box. If yes, at block 1207, the box is replaced by the value. If no, it is determined if leftInsert equals true. If yes, at block 1209, a group is constructed consisting of the new value followed the currently highlighted expression. If no, at block 1210, a group is constructed consisting of the currently highlighted expression followed by the new value.

In all cases of FIG. 12, control is eventually passed to block 1205 where the value is returned to become the newly highlighted expression at block 916 of FIG. 9.

Figure 13:
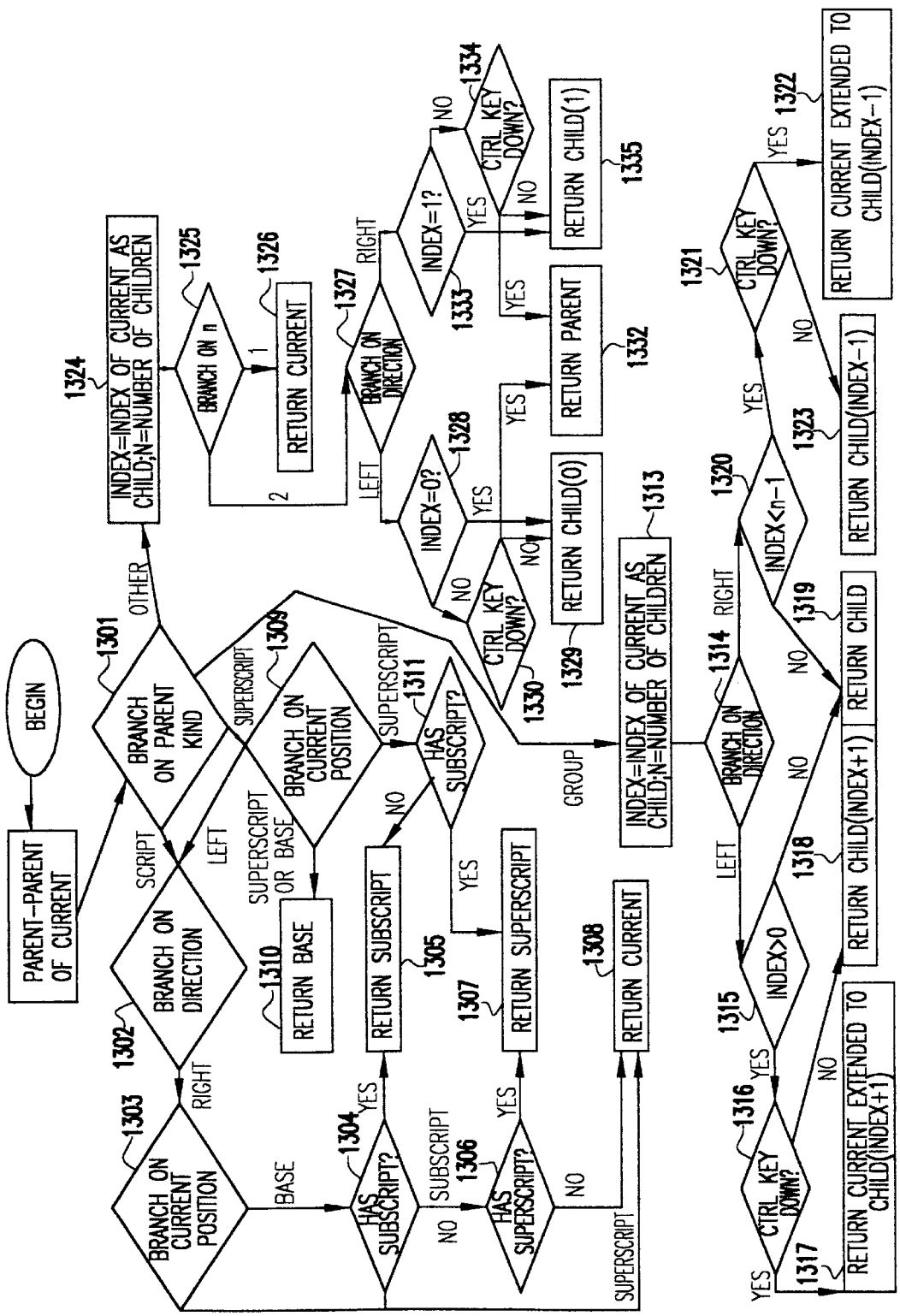

FIG. 13 shows a diagram of steps taken in block 913 of FIG. 9. First, at block 1300, the value of variable parent is set to the parent of the currently highlighted expression. Control then passes to block 1301 where one of three branches is taken depending on the kind of parent.

If the parent is a script, control passes to bock 1302, one of two actions is taken at block 1302 based on the next direction designated. If the direction is right, it is determined in block 1303 whether the current position is a base, subscript, or superscript. If a base, and it is determined that the base has a subscript in block 1304, the subscript is returned in block 1305. If the base has no subscript, it is then determined whether the base has a superscript in block 1306. If yes, then the superscript is returned in block 1307, but if not the currently highlighted expression is returned in block 1308. If the direction is right and the current position is a subscript, it is determined whether the subscript has a superscript in block 1306. If the direction is right and the current position is a superscript, the currently highlighted portion is returned in block 1308.

If the direction is left, it is determined whether the currently highlighted expression is a subscript, base, or a superscript in block 1309. If it is a base or subscript, the base is returned in block 1310. If the currently highlighted expression is a superscript, it is then determined whether the parent also has a subscript in block 1311. If so, block 1305 is performed; if not, block 1310 is performed.

If in block 1301, the parent is a group, control passes to block 1113 where the variable index is set to the index of current as a child of the parent, and variable n is set to the number of children of the parent. By convention, index equals 0 if current is the first child of the parent and equals n−1 if current is the last child of the parent. A directional branch is then performed in block 1314. If the branch is left and the index is greater than 0 in block 1315, it is determined whether the control key is being held down in block 1316. If yes, the currently highlighted portion is extended to the child (index+1) in block 1317, but if no, the child (index+1) is returned, in block 1318. If, in block 1315, index is not greater than zero the child is returned, in block 1319.

If the branch direction in block 1314 is right and the index is less than n−1 in block 1320, it is determined whether the control key is down in block 1321. If yes, the currently highlighted expression is extended to the child (index−1) in block 1322, but if not, the child (index−1) is returned in block 1323.

If, in block 1301, the branch on parent kind is other than a group or a script, control passes to block 1324 where again the variable index is set to the index of current as child of the parent, and variable n is set to the number of children of the parent. Again, by convention, index equals 0 if current is the first child of the parent and equals n−1 if current is the last child of the parent. If the branch in block 1325 is "1", the currently highlighted portion is returned in block 1326. If the branch on n is "2", the branch direction is then determined in block 1327. If left and index equals zero in block 1328, the first child is returned in block 1329. If left and index does not equal zero, it is determined whether the control key is down in block 1330, and if no, the first child is returned in block 1329, and if no, the parent expression is returned in block 1332.

If the branch direction in block 1327 is right and index does not equal 1 in block 1333, it is determined whether the control key is down in block 1334. If yes, the parent is returned in block 1332, but if no, the last child is returned in block 1335. If in block 1333, index=1, then the last child is returned in block 1335. If the control key is not down, block 1335 is also performed.

Figure 14:
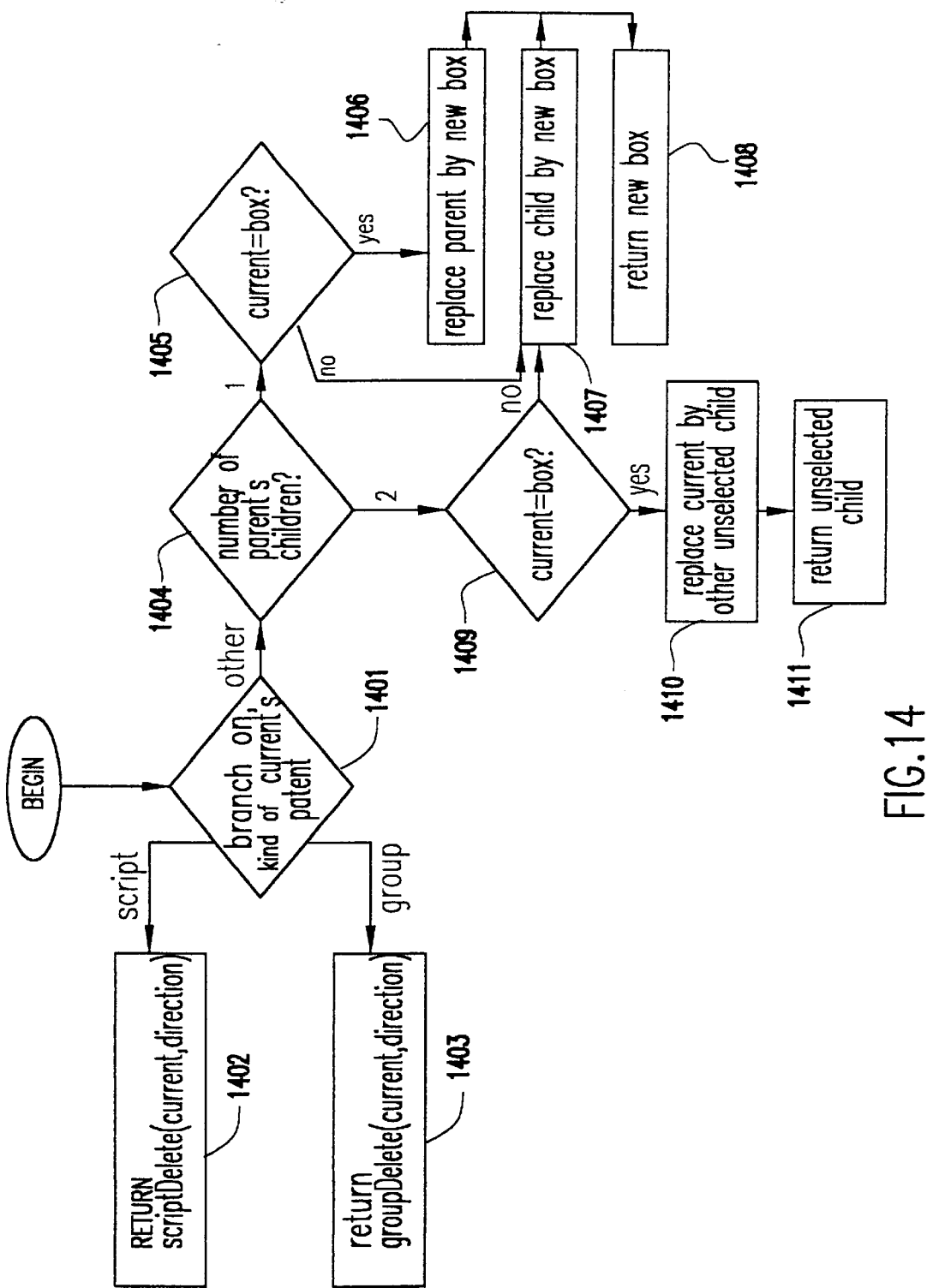

FIG. 14 shows a diagram of steps taken in block 914 of FIG. 9. In FIG. 14, a branch is performed in block 1401 on the kind of the parent of the currently highlighted expression. If the kind is script, the script of the currently highlighted portion is deleted in block 1402 in the designated direction, as described in FIG. 15 and below. If a group, the currently highlighted group is deleted in block 1403 in the designated direction, as described in FIG. 16 and below. If the current's parent is another kind, the number of children of the parent is determined in block 1404. If there is only one child, a decision is made as to whether current=box in block 1405, and if yes, the parent is replaced by the new box in block 1406, and the new box is returned, in block 1408. If no, the child is replaced by the box in block 1407, after which block 1407 is performed.

If there are two children in block 1404 and current does not equal box in block 1410, then block 1407 is performed. If, however, current=box in block 1410, the currently highlighted portion is replaced by another unselected child in block 1411.

Figure 15:
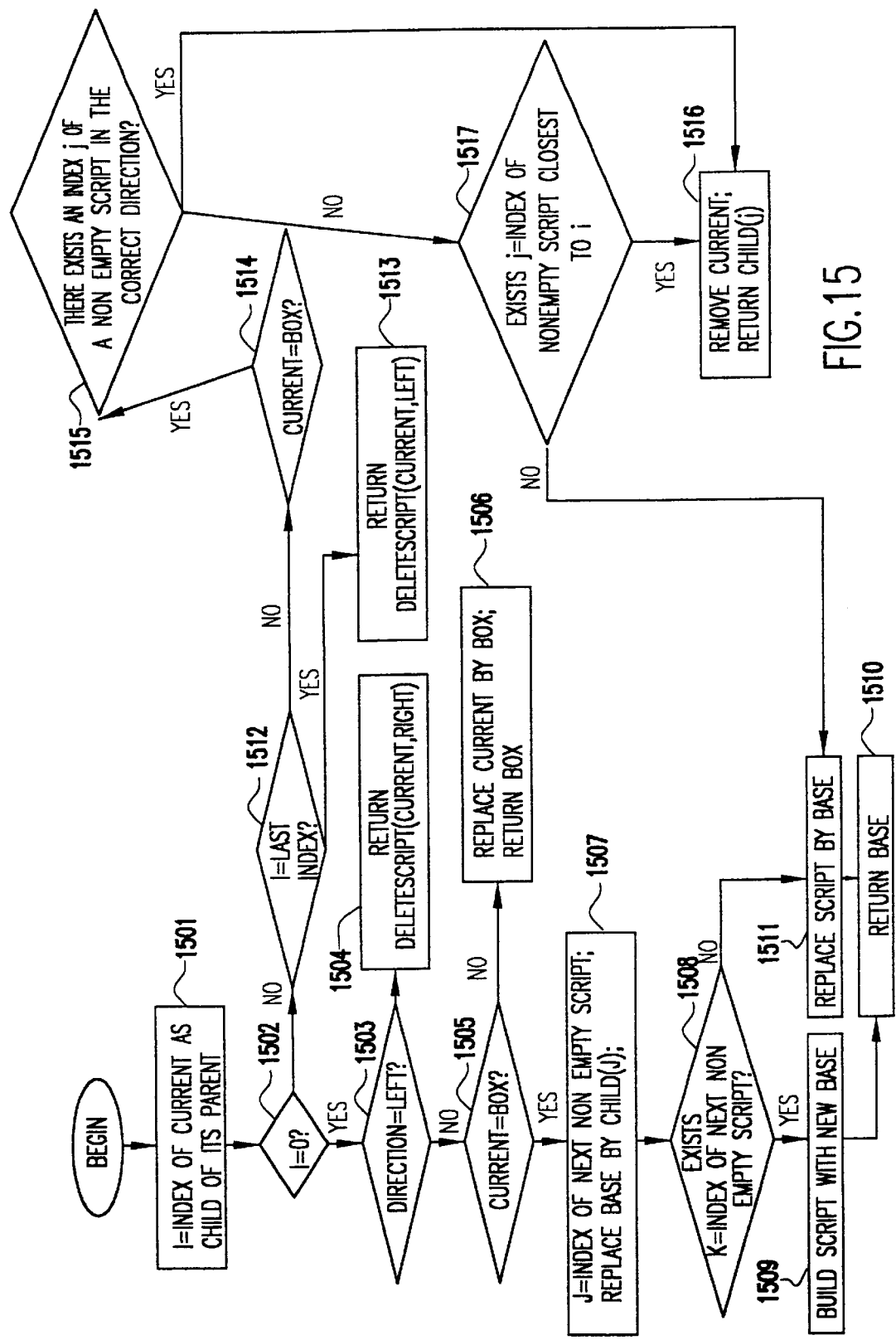

FIG. 15 shows a diagram of steps taken by the claimed invention in deleting a script, that is, the implementation of the function deleteScript applied to one argument: direction, right or left, which means that following the deletion the highlight will move from right or move left.

This flow chart shows the general algorithm when any number of scripts are given; in our implementation however, we have but two kinds of scripts so that the base of the parent is the first child (index=0), the subscript is the second child (index=1), and the superscript is the third child (index=2).

In FIG. 15, the variable i is set equal to the index of current as a child of its parents in block 1501. Then, it is determined if index equals zero in block 1502. If yes, and the left direction has been designated in block 1503, the script is deleted in the opposite direction in block 1504. If the left direction has not been designated in block 1503, it is determined whether current=box in block 1505.

If no, the currently highlighted expression is replaced by the box in block 1506. If yes, j=index of non-empty script, and the base is replaced by child (j) in block 1507. In block 1508, it is determined whether there exists k equaled to the index of another non-empty script. If yes, a new script object is built with the new base and the script with index k, the new base is returned in block 1510. If no, the script is replaced by the base in block 1511.

If, in block 1502, the index i does not equal zero, it is determined whether the current index equals the last index in block 1512. If yes, the script is deleted in the opposite direction in block 1513. If no, it is determined whether the current expression is an empty box in block 1514. If yes, control is passed to block 1515. There a decision is made as to whether there is a non-empty script in the given direction. For example, when deleting a subscript in the "right" direction, is there a remaining superscript. If yes, the subscript is removed and the non-empty superscript is returned to become the next highlighted expression by block 916 of FIG. 9, via block 1516. If no, a decision is made in block 1517 as to whether there exists any non-empty script that remains. If yes, again the current script is removed in block 1516 and non-empty script that is found is returned to become the next highlighted expression. If the decision for block 1517 is no, control passes to block 1510 where the entire script is replaced by the base and the base itself is returned to block 916 of FIG. 9 in block 1511 to become the next highlighted expression.

Figure 16:
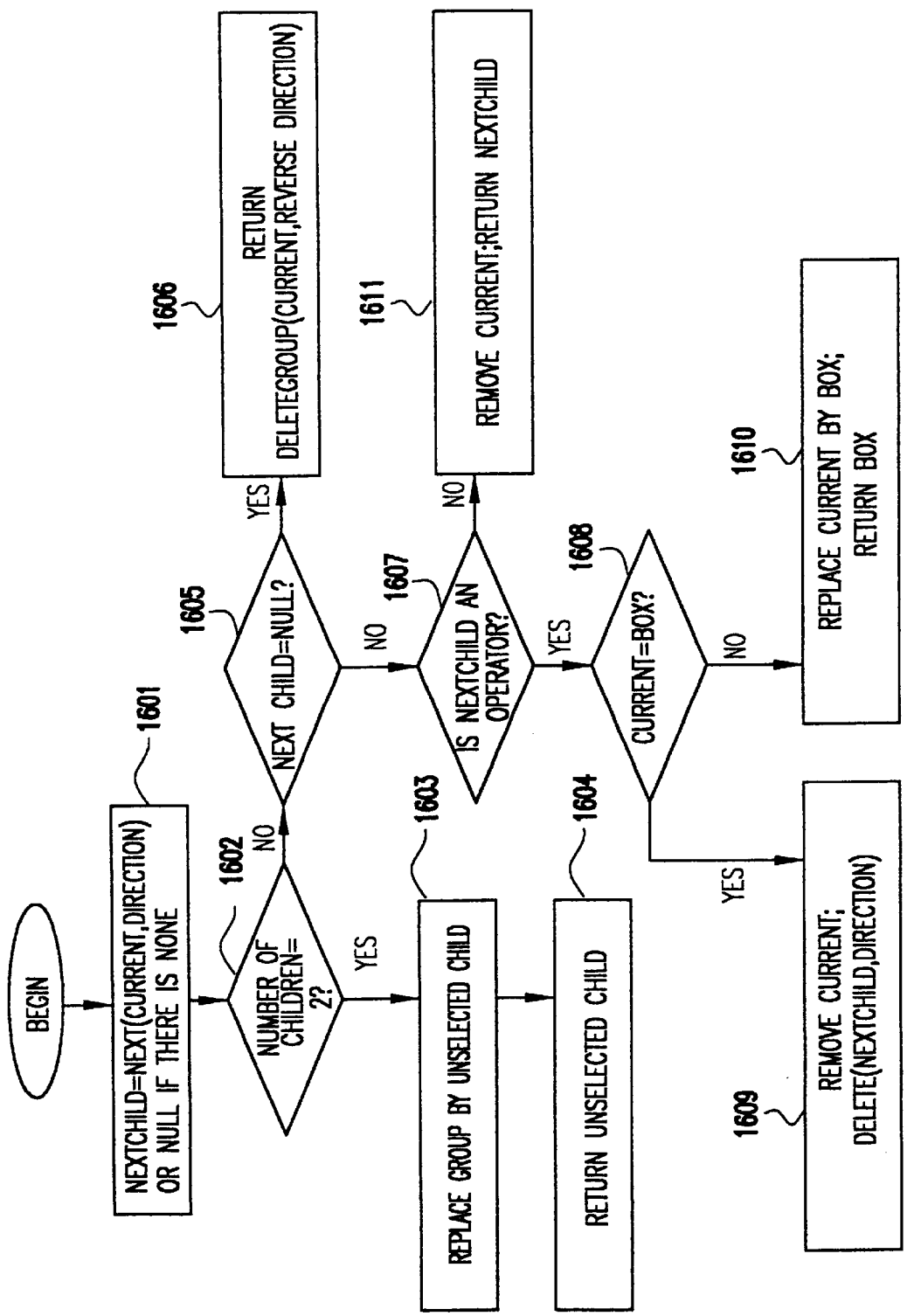

FIG. 16 shows a diagram of steps taken when a group is deleted in accordance with the present invention. In FIG. 16, nextChild=next(current, direction) or null if there is none, in block 1601. Then, it is determined if the number of children equals 2 in block 1602. If yes, the group is replaced by an unselected child in block 1603, and the unselected child is returned in block 1604. If no, it is determined whether the nextChild is null in block 1605. If yes, the group is deleted in the reverse direction in block 1606. If no, it is determined whether nextChild is an operator, say +, −, or =. If yes, control passes to block 1608 where a decision is made as to whether the current expression is an empty box. If no, the current expression is replaced by an empty box in block 1610, and the box is returned to become highlighted by block 916 of FIG. 9. If yes, at block 1609, current is removed from the expression and delete is recursively called on the expression given by nextChild in the given direction, thus transferring control to block 1401 of FIG. 14.

If, in block 1607, the nextChild expression is not an operator, the current expression is removed from the expression at block 1611 and nextChild is returned to become highlighted by block 916 of FIG. 9.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An expression editor implemented as a software program comprising:
    means for generating a hierarchical relation of mathematical objects that relate to a graphical rendering of a formula and a representation of the formula for a computational system, said means for generating including:
        means for forming a first expression tree including a hierarchal relation of objects representing said formula in a form suitable for presentation, said first expression tree being formed as a user enters said formula using said graphical user interface,
        means for forming a second expression tree including a hierarchical relation of objects that represent said formula in a form suitable for interpretation by a mathematical processor, and
        means for solving said formula as a result of said mathematical processor interpreting said second expression tree;
        means for editing the formula using a single visual cue in the form of a highlighted box enclosing at least one mathematical object of said formula by adding or deleting portions of said mathematical formula, wherein editing of said formula results in automatic modifications of said first and second expression trees; and
        means for correlating editing of said mathematical objects and control of the single visual cue with keyboard actions to allow for insertion, deletion, and navigation functions to be performed for the formula.

2. The expression editor of claim 1, wherein said editing means provides "what-you-see-is-what-you-get" (WYSIWYG) editing of the formula using the single visual cue.

3. The expression editor of claim 1, wherein said editing means allows a user to create a formula from scratch using the single visual cue.

4. The expression editor of claim 2, wherein said keyboard actions are initiated by predetermined keys of a keyboard, said predetermined keys, when actuated, moving the position of the single visual cue for navigation around said formula.

5. A method for creating a mathematical expression, comprising:
    providing a graphical user interface for entering a formula on a display, said graphical user interface including a single visual cue in the form of a highlighted box enclosing at least one mathematical object of said formula allowing a user to both insert and delete portions of said mathematical formula;
    forming a first expression tree including a hierarchal relation of objects representing said formula in a form suitable for presentation, said first expression tree being formed as a user enters said formula using said graphical user interface;
    forming a second expression tree including a hierarchical relation of objects that represent said formula in a form suitable for interpretation by a mathematical processor; and
    solving said formula as a result of said mathematical processor interpreting said second expression tree;
    editing said formula using said single visual cue by adding or deleting portions of said mathematical formula, wherein editing of said formula results in automatic modification of said first and second expressions trees; and
    correlating editing of said formula with said single visual cue with keyboard actions to allow insertion, deletion, and navigation functions to be performed for said formula.

6. A computer program product for use with a computer having a graphical user interface for allowing a formula to be created or edited on a display device, comprising:
    a computer readable medium with a computer program recorded thereon, the program including:
        (a) first code means for causing the computer to interpret commands issued by a user on said graphical user interface;
        (b) second code means for causing the computer to form a first expression tree including a hierarchal relation of objects representing said formula in a form suitable for presentation, said first expression tree being formed as a user enters said formula using said graphical user interface;
        (c) third code means for causing the computer to form a second expression tree including a hierarchical relation of objects that represent said formula in a form suitable for interpretation by a mathematical processor;
        (d) fourth code means for causing the computer to solve said formula by interpreting said second expression tree;
        (e) fifth code means for editing said formula using said single visual cue by adding or deleting portions of said mathematical formula, wherein editing of said formula results in automatic modification of said first and second expressions trees; and
        (f) sixth code means for correlating editing of said formula with said single visual cue with keyboard actions to allow insertion, deletion, and navigation functions to be performed for said formula.

* * * * *